United States Patent [19]

Cremeans

[11] 4,217,965
[45] Aug. 19, 1980

[54] METHOD FOR PREVENTING FLUID LOSS DURING DRILLING

[76] Inventor: Jim G. Cremeans, 3800 Planz Rd., Bakersfield, Calif. 93309

[21] Appl. No.: 68,408

[22] Filed: Aug. 21, 1979

[51] Int. Cl.³ .......................................... E21B 33/138
[52] U.S. Cl. ................................ 175/72; 252/8.5 LC
[58] Field of Search ................ 175/65, 72; 252/8.5 A, 252/8.5 LC; 166/282, 283, 292, 293

[56] References Cited

U.S. PATENT DOCUMENTS

| | | | |
|---|---|---|---|
| 2,599,745 | 6/1952 | Campbell et al. | 252/8.5 LC |
| 2,691,629 | 10/1954 | Stoner . | |
| 2,695,669 | 11/1954 | Sidwell | 166/292 |
| 2,749,308 | 6/1956 | Van Beckum . | |
| 2,778,604 | 1/1957 | Reistle, Jr. | |
| 2,789,948 | 4/1957 | Tronolone . | |
| 2,800,964 | 7/1957 | Garrick | 252/8.5 LC X |
| 2,811,488 | 10/1957 | Nestle et al. | |
| 2,836,555 | 5/1958 | Armentrout | 175/72 X |
| 3,057,797 | 10/1962 | Anderson et al. | |
| 3,208,524 | 9/1965 | Horner et al. | 175/72 X |
| 3,219,111 | 11/1965 | Armentrout . | |
| 3,221,825 | 12/1965 | Henderson . | |
| 3,318,378 | 5/1967 | Coshow | 175/72 X |
| 3,441,528 | 4/1969 | Dede et al. | |
| 3,467,208 | 9/1969 | Kelly, Jr. | 175/72 |
| 3,629,102 | 12/1971 | Lummus et al. | 252/8.5 LC |
| 3,723,311 | 3/1973 | Lummus et al. | 252/8.5 A |
| 3,788,405 | 1/1974 | Taylor | 175/72 |

*Primary Examiner*—James A. Leppink
*Assistant Examiner*—George A. Suchfield
*Attorney, Agent, or Firm*—Poms, Smith, Lande & Rose

[57] ABSTRACT

A method is disclosed for preventing loss of aqueous drilling fluid to porous formations penetrated by a well bore during drilling operations for oil and gas. The method utilizes readily available pelleted cottonseed hulls as the lost circulation material which is added to the drilling fluid and pumped down the well bore. The pelleted cottonseed hulls are composed of cottonseed hulls, cottonseed meal, bentonite, a residual amount of cottonseed lint and a surface active agent. The cottonseed hulls, cottonseed meal, bentonite, residual lint and surface active agent are heated in the presence of steam and compressed to form pellets. Because the pellets are in a compressed form, they do not expand when added to the drilling fluid until they are well down the well bore. The pelleted cottonseed hulls may also contain cottonseed oil. The pelleted cottonseed hulls are well known and widely used in the dairy cattle industry as a pelleted feed material.

12 Claims, No Drawings

METHOD FOR PREVENTING FLUID LOSS DURING DRILLING

BACKGROUND OF THE INVENTION

The present invention relates to methods and materials used for sealing the walls of a well bore passing through a porous formation during the drilling process for oil, gas and water wells in both on shore and off-shore operations. The present invention is also useful in air drilling.

In general, during the drilling of oil wells, drilling fluid is passed continuously from the surface of the well bore to the bottom of the bore through the drilling bit and recycled back to the surface. The drilling fluid is introduced to lubricate the drill bit and drill string, cool the drill bit and additionally remove the cuttings from the bottom of the hole to the surface of the well bore. A major problem is encountered in the drilling process when the drill bit passes through porous or fractured formations wherein there is a high porosity which results in the drilling fluid being lost to the porous structure. This problem is commonly referred to as lost circulation. To either prevent or correct the problem of lost circulation, prior art workers have utilized a wide variety of substances as additives to the drilling fluid to prevent lost circulation. These materials are known as lost circulation materials. The lost circulation materials can be added during drilling or when a very large porous structure is encountered and the use of cement is required to seal off the porous structure, the lost circulation material may be pumped down the well prior to the addition of cement to form a binder or mesh surface to keep the amount of cement lost to the porous structure at a minimum.

The use of unginned cotton as a lost circulation material is described in U.S. Pat. No. 2,691,629 issued to Robert A. Stoner in 1954. In this patent, the addition of unginned cotton with the seeds attached was found to provide a useful lost circulation material. The patent additionally discloses in Tables 1 and 2 that according to tests performed on cottonseed hulls alone, adequate sealing was not accomplished by the use of cottonseed hulls alone.

The present invention discloses the heretofore unknown use of cottonseed hulls to provide an adequate lost circulation material without the necessity of using the bulky unginned cotton fibers. Since large quantities of the lost circulation materials are utilized in the process of drilling for oil and gas wells, it is very desirable to have a lost circulation material which is readily available, inexpensive, easily handled and readily mixed with the drilling fluid and easily pumped down the well bore. Many of the prior art materials such as leather, whole unginned cotton, wood fibers, etc. although inexpensive in their natural condition must be processed by grinding, fluffing or treating prior to use as a lost circulation material. The process of mixing can be awkward with a highly viscous drilling fluid resulting many times. The specially treated cottonseed hulls of the present invention are readily available in pelleted form as a feed commonly used for dairy cattle. The pellets are highly compressed material. Therefore, they are not as bulky as prior art materials and may be more easily handled. The more dense, less bulky material of the present invention is particularly desirable since in most drilling operations the space available for storing lost circulation material is limited, this is especially critical in off shore drilling operations. The pelleted shape allows easy addition of the cottonseed hulls by any convenient method such as a hopper. Because of their compressed nature and composition, the pelleted cottonseed hulls are easily mixed and pumped down the well bore without appreciably affecting the viscosity of the drilling fluid until they are in a position to seal off the porous structures. Additionally, the pelleted cottonseed hulls may be added directly to the well opening when desired.

It is particularly desirable to have such a lost circulation material which can be introduced into the well bore as quickly and easily as possible to keep lost circulation to a minimum when porous structures are encountered during the drilling process. The prior art materials are generally very fibrous and bulky in nature making introduction into the well bore difficult.

It is desirable to add as much lost circulation material to the drilling fluid as possible to seal off the porous structures in as short a time as possible. However, the amount of lost circulation material which can be added to a drilling fluid is limited due to the creation of a highly viscous drilling fluid which cannot be pumped down the well bore. The pelleted cottonseed hulls utilized in the present invention overcomes this problem by a novel time controlled expansion. The ingredients of the pelleted cottonseed hulls are heated and compressed during processing to prevent the expansion of the pellets during use as a lost circulation material until they are well down the drilling hole. This allows easy mixing without forming a viscous unpumpable drilling fluid followed at a later time by expansion of the pellets to exhibit the desired properties of a lost circulation material.

SUMMARY OF THE INVENTION

It is therefore an object of the present invention to provide a lost circulation material composed of cottonseed hulls which does not require fibrous material to function as a lost circulation material.

Another object of the present invention is to provide and disclose a lost circulation material and process which requires as few as possible operations in the field and utilizes a material which is readily available, inexpensive and easy to handle.

Another object of the present invention is to disclose and provide a method for preventing lost circulation where expansion of the lost circulation material is delayed until the material has been pumped down the well bore.

A final object of the present invention is to provide a lost circulation material which has a high density for transportation, storage and handling purposes, but exhibits the desired bulky qualities of a lost circulation material when it is pumped down the well bore.

The above objects and others are accomplished by the novel use of pelleted cottonseed hulls which are prepared in a pelleted form and commonly used as dairy cattle feed. The pelleted cottonseed hulls, as provided for dairy cattle feed, contain cottonseed hulls in combination with cottonseed meal, bentonite, a small amount of cottonseed lint and a surface active agent. The process by which the pelleted cottonseed hulls are produced is well known in the art of dairy cattle feed manufacture. The process utilizes cottonseeds which have been substantially delinted. Only a residual amount of lint remains on the cottonseeds.

The cottonseeds are crushed and the cottonseed oil may be extracted by common techniques. The resulting mixture of cottonseed hulls, cottonseed meal and residual amount of cottonseed lint is combined with bentonite and a surface active agent and heated in the presence of steam. The heated mixture is then compressed and extruded as pellets from pelleting machines common in the dairy cattle feed industry. Cottonseed oil may also be left in or added to the mixture if desired.

In the process of the present invention, the pelleted cottonseed hulls, as supplied by cattle feed manufacturers, are utilized as a lost circulation material by adding them to the drilling fluid in widely varying amounts depending upon the viscosity of the drilling fluid. Amounts of pelleted cottonseed hulls may be added to the drilling fluid to provide drilling fluids having as much as 75% by weight pelleted cottonseed hulls. The pelleted cottonseed hulls are added to the drilling fluid directly without any further processing. The pellets may even be dumped directly into the well opening. This provides an inexpensive, easily managed, fast operation for preventing lost circulation as opposed to prior art methods requiring special grinding, shredding and other pretreatment processes. The present invention also precludes the necessity for adding surface active and wetting agents during admixture of the lost circulation material with the drilling fluid. Additionally, the pelleted cottonseed hulls of the present invention may be added to the drilling fluid without creating a highly viscous drilling fluid which is difficult to pump down the well bore. Because of their high density, the pellets are easily transported, stored and handled as opposed to the bulky additives of the prior art.

A more complete understanding of the material and process of the present invention, as well as a recognition of additional objects and advantages therefor, will be afforded to those skilled in the art from a consideration of the following detailed description of an exemplary embodiment thereof.

DETAILED DESCRIPTION OF A PREFERRED EXEMPLARY EMBODIMENT

The preferred exemplary embodiment of the present invention utilizes pelleted cottonseed hulls as the material to prevent or correct the loss of drilling fluid to porous formations during the drilling of oil and gas wells.

The pelleted material utilized in the present invention is obtained in a ready to use form from dairy cattle feed manufacturers. The use of pelleted cottonseed hulls as dairy cattle feed is well known in the dairy cattle industry and various and sundry methods are utilized for the preparation thereof.

The process of pelleted cottonseed hull production preferred by the present invention utilizes crushed cottonseeds which have been substantially delinted. The cottonseeds are crushed and the cottonseed oil extracted by conventional solvents and methods. The crushed cottonseeds containing cottonseed meal, cottonseed hulls, and a residual amount of lint are treated with a surface active agent and mixed with bentonite and then introduced into tubular furnaces at a temperature between about 100° C. to 160° C. Steam generated from the cottonseed hulls themselves plus any additional steam which must be added is utilized to keep the steam level within the heated tubes near 9% to 12% by volume. The mixture is compressed and extruded from pelleting machines as pellets ranging in diameters from $\frac{1}{4}$ inch to $\frac{3}{8}$ inch and ranging in length from $\frac{1}{4}$ inch to 1 inch. The mixture is compressed and pelleted to form pellets having a density of between 30 and 40 lbs. per cubic foot, with the preferred density being about 36 lbs. per cubic foot. The $\frac{1}{4}$ inch diameter pellets are preferred for use in the present invention.

The mixture has a residence time of approximately 7 minutes within the heating and compression steps of the pelleting process. The majority of time is spent in the heating tubes.

The particular type of surface active agent is not particularly critical providing the agent is water soluble. Cationic and anionic water soluble surface active agents, may be used but it is preferred to utilize water soluble nonionic surfaces active agents such as those formed from lower alkylene oxide such as ethylene or propylene oxide. Exemplary of such nonionic surface active agents is Tergitol TMN 6 manufactured by Union Carbide. Tergitol TMN 6 is a nonionic trimethyl ether of polyethylene glycol.

The composition of the pelleted cottonseed hulls may range from 40% to 60% by weight cottonseed meal, 20% to 40% by weight cottonseed hulls, up to 3% by weight cottonseed lint, 10% to 30% by weight bentonite and up to 1.0% by weight of a surface active agent. The preferred composition of the pelleted cottonseed hulls is approximately 50% by weight cottonseed meal, approximately 31% by weight cottonseed hulls, approximately 1% by weight cottonseed lint, approximately 18% by weight bentonite and approximately 0.1% of a surface active agent such as Tergitol TMN-6. Cottonseed oil in amounts of up to 13% may also be left in or added to the crushed cottonseed hulls mixture and processed into pellets according to the above described method.

The pelleted cottonseed hulls are provided in bulk form from dairy cattle feed manufacturers and are ready for use in the prevention and correction of lost circulation as supplied.

When lost circulation due to absorption of drilling fluid by porous structures occurs in the drilling operation, the pelleted cottonseed hulls may be added in widely ranging quantities. Amounts of pelleted cottonseed hulls may be added to the drilling fluid to provide drilling fluids having as much as 75% by weight pelleted cottonseed hulls. In normal drilling operations, pelleted cottonseed hull concentrations in the drilling fluid of 10% to 25% are normally adequate to seal the majority of porous structures encountered by the well bore. The pelleted cottonseed hulls may also be combined with drilling fluid to form a slurry which is pumped down the well bore to form a binder or mesh surface on which cement is held. When a large porous structure is encountered, cement may be pumped down the well bore to seal off the porous structure. To prevent the loss of large amounts of relatively expensive cement to the porous formation, the pelleted cottonseed hull slurry is first pumped down the well bore to provide a binder or mesh surface which greatly reduces the porosity of the porous structure. By reducing the porosity of the structure, less cement is used in the sealing process. Since the pelleted cottonseed hulls may be introduced into the well bore in higher amounts than prior art materials, they keep cement loss at a minimum due to the increased binding or meshing surface made available at the porous structure.

Additionally, due to the time controlled expansion and absorption characteristics of the pelleted cottonseed hulls, the pellets absorb water from the cement as it is pumped to the porous structure thereby causing the cement to set more quickly.

The pelleted cottonseed hulls are easily added to the drilling fluid by any conventional means such as shovels, skip loaders, hoppers and the like. They may be dumped directly from bags. Since the pelleted cottonseed hulls come in a ready to use form, there is no pretreatment required such as fluffing or grinding and shredding. Additionally, the pelleted cottonseed hulls may be added directly to the well opening when desired.

A major advantage of the present invention is its ability to readily mix with the drilling fluid without increasing the drilling fluid viscosity. The heating and compression process which is utilized in the preparation of the pelleted cottonseed hulls for cattle feed purposes is extremely useful in giving the pelleted cottonseed hulls of the present invention their desirable characteristics.

Specifically, the dense cottonseed pellets retain their shape and structural integrity as they are added to the drilling fluid. Since the pellets do not immediately break down and absorb large quantities of water, the viscosity of the drilling fluid remains low. This is a major improvement over prior art materials which render a very viscous drilling fluid when they are added. The pellets only begin to absorb substantial amounts of water, causing expansion and pellet breakdown, after they are well down the drilling hole.

The pellets are small enough and have no appreciable amount of fibers so that they are easily pumped down the well bore by conventional pumping methods. As the pellets are pumped into the well bore, they begin to expand. Total expansion of the pellets may take up to 30 minutes. Since the circulation time of the drilling fluid may range from 30 minutes to an hour, the pellets are continually expanding during circulation. The expansion rate of the pellets can be varied by controlling the water temperature. This time controlled expansion is a major improvement over prior art materials because it provides a lost circulation material which only begins to exhibit properties necessary for proper sealing of the porous structures after the material has been pumped into the well bore. This novel concept solves the crucial problem of highly viscous, unpumpable drilling fluid resulting from the addition of large amounts of bulky prior art lost circulation materials.

Since the pelleted cottonseed hulls of the present invention are more compact than the bulky prior art materials, they can be stored and transported in much smaller space. This is especially important in off shore drilling operations, where storage space is limited.

The pelleted cottonseed hulls as used in the present method provide a substantial improvement over prior art materials because they can be introduced in large amounts into the drilling fluid without causing the formation of a highly viscous, difficult to pump drilling fluid. This allows a larger quantity of lost circulation material to be introduced into the well bore in a shorter period of time, thereby keeping lost circulation at a minimum.

Additionally, since wetting and expansion of the pellets is delayed by the compressed nature of the cottonseed pellets until after the pellets have been pumped down the well bore, admixture time is kept at a minimum resulting in the pellets reaching the porous structure in as short a time as possible. Prior art materials, which tend to be fibrous and bulky in nature, require a longer time for admixture with the drilling fluid and many times require the use of wetting agents.

Having thus described the preferred exemplary embodiment of the present invention, it should be noted by those skilled in the art that the within disclosures are exemplary only and that various other alternatives, adaptations and modifications may be made within the scope of the present invention which is defined and limited only by the following claims.

I claim:
1. A method for preventing loss of aqueous drilling fluid to porous formations penetrated by a well bore during drilling operation which comprises the steps of:
   mixing pelleted cottonseed hulls consisting essentially of 40% to 60% cottonseed meal by weight, 20% to 40% cottonseed hulls by weight, up to 3% cottonseed lint by weight, 10% to 30% bentonite by weight and up to 1.0% by weight of a surface active agent with said aqueous drilling fluid to form a lost circulation mixture; and
   introducing said lost circulation mixture into said well bore in an amount sufficient to effectively seal said porous formations penetrated by said well bore.

2. The method for preventing loss of aqueous drilling fluid according to claim 1 wherein said lost circulation mixture comprises between 5% to 75% of said pelleted cottonseed hulls by weight.

3. The method for preventing loss of aqueous drilling fluid according to claim 1 wherein said pelleted cottonseed hulls consists essentially of 50% cottonseed meal by weight, approximately 31% cottonseed hulls by weight, approximately 1% cottonseed lint by weight, approximately 18% bentonite by weight and approximately 0.1% by weight of a surface active agent.

4. The method for preventing loss of aqueous drilling fluid according to claim 1 wherein said pelleted cottonseed hulls additionally consist of between 10% and 20% cottonseed oil.

5. The method for preventing loss of aqueous drilling fluid according to claim 1 wherein said cottonseed hulls, cottonseed meal, cottonseed lint, bentonite and surface active agent are heat processed and then compressed into pellets.

6. The method for preventing loss of aqeous drilling fluid according to claim 5 wherein said heat process comprises the step of heating the cottonseed hulls, cottonseed meal, cottonseed lint, bentonite and surface active agent in the presence of steam.

7. The method for preventing loss of aqueous drilling fluid according to claim 5 wherein said heat process is conducted at a temperature of between 100° C. and 170° C. in the presence of steam.

8. The method for preventing loss of aqueous drilling fluid according to claim 7 wherein said heat process is conducted at a temperature of between 150° C. and 170° C. in the presence of steam.

9. The method for preventing loss of aqueous drilling fluid according to claim 5 wherein said surface active agent is a water soluable nonionic surfactant.

10. The method for preventing loss of aqueous drilling fluid of claim 1 wherein said cottonseed hulls are heated in the presence of steam and a surface active agent.

11. The method for preventing loss of aqueous drilling fluid according to claim 9 wherein said nonionic surfactant is a trimethyl nonyl ether of polyethylene glycol.

12. The method for preventing loss of aqueous drilling fluid according to claim 1 wherein said pelleted cottonseed hulls have a density of between 30 pounds per cubic foot and 40 pounds per cubic foot.

* * * * *